April 21, 1953     L. A. BROOKS ET AL     2,636,022
DIELECTRIC COMPOSITIONS
Filed Sept. 14, 1950
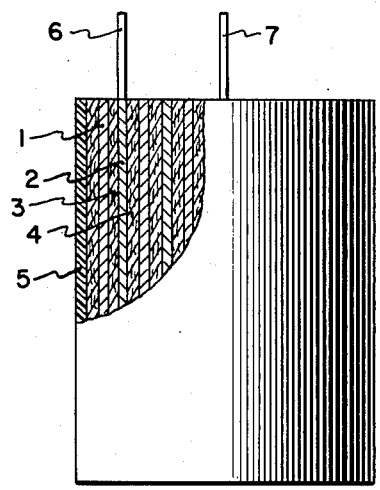
INVENTORS:
LESTER A. BROOKS
MOUSHY MARKARIAN
& MATHEW NAZZEWSKI
BY
their ATTORNEY Patented Apr. 21, 1953

2,636,022

UNITED STATES PATENT OFFICE 2,636,022

DIELECTRIC COMPOSITIONS

Lester A. Brooks, East Norwalk, Conn., Moushy Markarian, North Adams, and Mathew Nazzewski, Adams, Mass., assignors to Sprague Electric Company, North Adams, Mass., a corporation of Massachusetts Application September 14, 1950, Serial No. 184,838

5 Claims. (Cl. 260—79.7)

This invention relates to improved dielectric compositions and more particularly refers to resinous vinyl polymers containing oxygen and/or sulfur.

The use of vinyl polymers as dielectric materials is well known. Polystyrene, polyvinyl chloride, polyethylene and many other polyvinyl resins are widely used for insulation purposes, e. g. cable coating, terminals, coil forms, casings and the like. In some cases, the monomeric compounds have been introduced in wound electrical condensers and subsequently polymerized in situ to produce a solid dielectric medium between electrodes. This procedure is desirable since no special containers or sealing devices are required for the unit as with liquid dielectrics. Unfortunately, however, most of the polymers of the vinyl compounds heretofore proposed as dielectric impregnants possess low dielectric constants, which will not permit production of units of the same capacity as identical condensers impregnated with castor oil, chlorinated diphenyls and other higher dielectric constant materials. Thus, there is a need for polymerizable vinyl compounds possessing, in polymer form, a relatively high dielectric constant, low electrical losses, as well as a high softening point and a satisfactory resistance to moisture and corrosive atmospheres. This application is a continuation-in-part of our copending patent application Serial Number 559,460, filed October 19, 1944, now Patent No. 2,522,501.

It is an object of this invention to overcome the foregoing disadvantages. It is a further object to produce new and improved dielectric compositions. A still further object is to produce stable resinous dielectric materials containing polar elements. A still further object is to produce new copolymers. Additional objects will become apparent from the following description and claims.

These objects are attained in accordance with the invention wherein vinyl compounds containing a polar element are polymerized to a solid state. In a more restricted sense, this invention is concerned with dielectric compositions produced by polymerizing a mixture containing two or more polymerizable vinyl compounds, at least one of which contains oxygen, or sulfur, in an electrically stable form. In a still more restricted sense this invention is concerned with a dielectric composition comprising a polymer of a vinyl compound containing oxygen and/or sulfur in an ether and/or thioether linkage or in a heterocyclic ring. The invention is further concerned with electrical condensers employing the dielectric compositions of the invention. The invention is also concerned with methods of producing the monomeric vinyl compounds disclosed herein. The polar elements disclosed as components of the monomeric vinyl compounds disclosed herein are oxygen and sulfur although it is contemplated that other polar elements may be similarly employed.

According to one of the preferred embodiments of the invention, new and improved dielectric compositions are produced by polymerizing vinyl compounds containing sulfur so positioned in the monomeric molecule as to be electrically and chemically stable. Thus the polymers may possess the advantages of a polar compound without being subject to the instability and high electrical losses usually associated therewith.

The compounds in which oxygen is part of a heterocyclic ring and in which the vinyl group is substituted on a carbon in the same or in a different ring may also be employed with success. Among these are the following compounds:

| | |
|---|---|
| 3-vinyl diazo oxide | 6-vinyl coumarone |
| 5-vinyl diazo oxide | 7-vinyl coumarone |
| 2-vinyl pyrane | 2-vinyl cumarane |
| 3-vinyl pyrane | 3-vinyl cumarane |
| 4-vinyl pyrane | 4-vinyl cumarane |
| 1-vinyl γ pyrane | 5-vinyl cumarane |
| 2-vinyl γ pyrane | 6-vinyl cumarane |
| 3-vinyl γ pyrane | 7-vinyl cumarane |
| 4-vinyl γ pyrane | 1-vinyl brazane |
| 5-vinyl γ pyrane | 2-vinyl brazane |
| α vinyl furan | 3-vinyl brazane |
| β vinyl furan | 4-vinyl brazane |
| 2-vinyl coumarone | 5-vinyl brazane |
| 3-vinyl coumarone | 6-vinyl brazane |
| 4-vinyl coumarone | 7-vinyl brazane |
| 5-vinyl coumarone | 8-vinyl brazane |

The preferred embodiment of the invention refers to vinyl compounds in which sulfur appears either in a thioether or in a heterocyclic ring employed as polymerizable dielectric compositions. Representative of the vinyl thioethers are the following compounds (in which the vinyl group preferably appears on an aromatic ring):

o-Vinyl diphenyl sulfide
m-Vinyl diphenyl sulfide
p-Vinyl diphenyl sulfide
o-Vinyl phenyl-α-naphthyl sulfide
m-Vinyl phenyl-α-naphthyl sulfide
p-Vinyl phenyl-α-naphthyl sulfide
β-vinyl-α-α'-binaphthyl sulfide
o-Vinyl phenyl alkyl sulfides
m-Vinyl phenyl alkyl sulfides
p-Vinyl phenyl alkyl sulfides The sulfur containing vinyl compounds in which the vinyl group is substituted on a carbon atom and the sulfur appears as a member of a heterocyclic ring may be representatively listed as follows:

4-vinyl benzothiophene
5-vinyl benzothiophene
1-vinyl thionaphthene
2-vinyl thionaphthene
3-vinyl thionaphthene
4-vinyl thionaphthene
5-vinyl thionaphthene
6-vinyl thionaphthene
1-vinyl thiopyrane
2-vinyl thiopyrane
3-vinyl thiopyrane In addition to the heretofore mentioned sulfur and oxygen containing compounds, heterocyclic vinyl compounds in which two or more polar elements appear as ring members may be employed in accordance with the invention with good results. Among these are:

2-vinyl piazthiole
3-vinyl piazthiole
N-vinyl benzoazole
2-vinyl benzoazole
3-vinyl benzoazole
4-vinyl benzoazole
1-vinyl diazo oxide
2-vinyl diazo oxide
3-vinyl diazo oxide
1-vinyl diazo sulfide
2-vinyl diazo sulfide
3-vinyl diazo sulfide
2-vinyl thiazole
3-vinyl thiazole
4-vinyl thiazole
2-vinyl oxazole
3-vinyl oxazole
4-vinyl oxazole With reference to the compounds heretofore mentioned, it is to be understood that various alkylated and/or halogenated derivatives of the compounds may be employed to obtain products possessing different melting points, dielectric constants, polymerization properties and the like. Further, isomers of the above mentioned compounds may be employed.

According to another preferred embodiment of the invention, the monomeric vinyl compounds of the invention may be copolymerized with other monomeric polymerizable vinyl compounds, to obtain modified polymers possessing valuable properties. Among the polymerizable vinyl compounds which may be used are styrene and its halogenated and/or alkylated derivatives; vinyl acetylenes; ethylene and halogenated derivatives thereof, such as tetrafluoroethylene; butadiene, etc. Small percentages of the monomeric compounds of the invention added to many of the monomeric compounds listed above, will produce, upon polymerization, polymers of increased resilience and resistance to heat.

The following examples illustrate suitable methods of preparing the compounds of the invention, but it is to be understood that the invention is not limited to the specific processes and methods described.

*Example I.—Vinyl diphenyl sulfide*

Diphenyl sulfide is reacted with acetyl chloride in the presence of aluminum chloride. The ketone thus produced had a boiling point of 170° C. at 1 mm. pressure. The ketone was reduced by standard means to the carbinol. The boiling point of the carbinol could not be determined, as it readily dehydrated by itself when heated. The dehydrated product, para vinyl biphenyl sulfide, had a boiling point of 135–140° C. at 1 mm. pressure.

*Example II*

Para vinyl biphenyl sulfide as produced in Example I was polymerized and copolymerized as indicated in the table below. The polymerizations were conducted for 24 hours at 120° C.

TABLE

| Parts by weight p-vinyl biphenyl sulfide | Parts other monomer | Catalyst | Appearance at 25° C. |
|---|---|---|---|
| 100 | None | None | Hard, glassy. |
| 100 | do | .1% benzoyl peroxide (BP). | Hard, glassy, yellowish. |
| 75 | 25 styrene | None | Hard, glassy. |
| 25 | 75 styrene | .1% BP | Do. |
| 75 | 25 N-vinyl carbazole | do | Reddish, brittle. |
| 5 | 95 styrene | None | Slightly yellowish hard polymer. |
| 95 | 5 p-divinyl benzene | do | Infusible polymer. |

The vinyl biphenyl sulfide can be copolymerized with butadiene-1,3 to produce rubbery compounds useful as a replacement for natural rubber.

Other means may be employed for producing the vinyl biphenyl sulfides as well as the other polymerizable compounds described herein. An ethyl group introduced into the position where the vinyl group is desired may be reacted with chlorine or bromine to form a bromo or chloro ethyl side chain which may be dehydrohalogenated to the vinyl group. Other conventional syntheses for the preparation of vinyl groups on aromatic and heterocyclic rings may be employed.

According to a further embodiment of the invention, the monomeric compounds of the invention may be polymerized by simple and effective means. When the polymer is to be used for electrical purposes, the polymerization is preferably effected by subjecting the monomer to temperatures from about 70° C. to about 150° C. and preferably from about 100° C. to about 130° C., over extended periods of time. The polymerization may also be effected by use of benzoyl peroxide, oxygen, sulfur dioxide, boron trifluoride and other accelerating agents commonly employed in the thermoplastic field.

The appended drawing illustrates one of the preferred embodiments of the invention, e. g. an electrical condenser employing one of the compositions of the invention as dielectric media. More specifically, 1 and 2 represent electrode foils, which are convolutively wound and separated by dielectric material 3 and 4. Terminal tabs 6 and 7 respectively are connected to electrode foils 1 and 2 respectively. Casing or container 5 encloses all or part of the wound condenser unit.

Electrode foils 1 and 2 may be of aluminum, lead, tin, copper or other highly conducting metal or alloy. Terminal tabs 6 and 7 are similarly selected and are generally of greater thickness to lend some degree of physical rigidity thereto. Dielectric spacers 4 and 3 may comprise a porous dielectric material such as a calendered kraft or linen paper, the pores of which are substantially completely filled with one of the polymers or copolymers of the invention. Alternately, 3 and 4 may represent one or more films of polymer (formed by extrusion, casting and the like) in which case a dielectric spacer of paper would not be required. In the case where a porous spacer is employed, it is highly advantageous to impregnate the wound condenser with one or more of the monomeric compounds disclosed herein, and subsequently cause polymerization thereof by exposure to elevated temperatures, thus polymerizing the impregnant in situ to form a compact, durable, moisture resistant element. Casing 5 may be of metal, of a non-conducting material, such as heavy cardboard, cellulose acetate, kraft paper, etc. It is not necessary to hermetically seal the condenser element, since the resinous dielectric material resists corrosion and moisture.

It is obvious that other forms of condensers such as stacked, rolled and pressed, etc. may be enhanced by use of the dielectric compositions of the invention therein.

The polymers and copolymers heretofore mentioned may be used for a variety of purposes. While they are particularly suitable for use in electrical condenser, ceramic coated wires, and other electrical equipment, they are useful in other fields, such as in the molding of various articles, for example, toilet articles, chinaware, toothbrush handles, furniture, as a wood and/or metal substitute, hardware, etc.; in the production of paints, lacquers, enamels, varnishes, etc.; in lighting fixtures, ultraviolet transmitting windows, edge-lighting signs, etc.; in the formation by extrusion of filaments and fibers for textiles, bristles, window screening, etc.; in the molding of buttons, buckles, etc.; for use on textiles where heat, crease and moisture resistance is desired; as a binder for plywood, cardboard paper, etc.; as a material for film and sheet formation, for use in wrapping foods and sealing containers, etc.

Another embodiment of this invention concerns the use as dielectric materials of mixtures of the polymers of this invention with chlorinated biphenyls, chlorinated naphthalenes and other dielectric compounds which are not true polymers.

In particular, the products hereof are useful in the electrical field as dielectric and molding compounds by virtue of their fairly low power factor, high leakage resistance and breakdown strength, high dielectric constant, etc.

More specific uses in the electrical field are, for example, coil forms, stand-off insulators, insulating rods and bushings, coil mounting strips, insulating beads for coaxial cable and similar applications. Used as an ingredient in special preparation, these products are useful for coating and treating coils and circuit parts for moisture resistance. These products when hydrogenated or otherwise saturated to prevent further polymerization have applications as a cable oil or condenser dielectric, cable impregnant or wire saturant.

In cases where the polymers are used for non-dielectric purposes it is generally advisable to incorporate therewith plasticizers and other materials, i. e., various fillers such as wood, flour, ground mica, rubber, talc, asbestos, zinc oxide, titanium dioxide, quartz, and the like and/or organic or inorganic color pigments. These are particularly useful when molded articles are made, since they increase the body or quantity with only slight increase in cost. Further, some fillers, particularly ground mica, possess high dielectric constants and properties in themselves, and are therefore of considerable value in the manufacture of dielectric compositions generally.

Some uses of the polymers of this invention may require somewhat softer or more flexible properties than are inherent in the polymer itself. It is therefore helpful to add thereto plasticizers or mixtures thereof such as ethylacetanilide, camphor, carbon tetrachloride, ethylene dichloride, hexachlorethane, sodium trichloracetate, ethylene dichloride, hexachlorethane, sodium trichloracetate, diphenyl phthalate, dibutyl phthalate, triphenyl phosphate, tricresyl phosphate, chlorinated biphenyls ("Arochlors"), keto aromatic acids, such as methyl benzolbenzoate, phthalides; substituted phthalides, glycerol, dibenzyl ether, butyl stearate, dixylylethane, paraffin, tritolyl, cresol, diphenylpropane, etc.

Another embodiment of this invention concerns methods of stopping the polymerization reaction and/or controlling the physical and/or chemical characteristics of the polymer. It is contemplated that the polymerization reaction may be stopped by hydrogenation; then the resulting polymer may be halogenated, etc., if desired, to obtain specific properties of the polymer. It may also be desired to nitrate or sulphonate following the hydrogenation to impart special properties to the polymer.

As many apparently widely different embodiments of this invention may be made without departing from the spirit and scope hereof, it is to be understood that the invention is not limited to the specific embodiments hereof except as defined in the appended claims.

What is claimed is:

1. A compound selected from the class which conforms to the formula

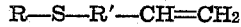

wherein R and R' are aromatic hydrocarbon nuclei in which any unsaturation is of the benzenoid type.

2. A monovinyl biphenyl sulfide in which the vinyl group is the sole substituent.

3. P-vinyl biphenyl sulfide.

4. A polymer of p-vinyl biphenyl sulfide.

5. A resinous composition comprising a polymer of the compound of claim 1.

LESTER A. BROOKS.
MOUSHY MARKARIAN.
MATHEW NAZZEWSKI.

References Cited in the file of this patent

UNITED STATES PATENTS

| Number | Name | Date |
| --- | --- | --- |
| 2,043,941 | Williams | June 9, 1936 |
| 2,125,649 | Reppe | Aug. 2, 1938 |